United States Patent [19]

Mardon et al.

[11] Patent Number: 4,938,921

[45] Date of Patent: Jul. 3, 1990

[54] METHOD OF MANUFACTURING A ZIRCONIUM-BASED ALLOY TUBE FOR A NUCLEAR FUEL ELEMENT SHEATH AND TUBE THEREOF

[75] Inventors: Jean-Paul Mardon, Caluire; Jacques Decours, Arpajon; Michel Weisz, Gometz le Chatel; Jacques Pelchat, Antony; Jean Le Pape, Saint Brevin, all of France

[73] Assignees: Framatome; S.N.C. Uranium Pechiney et Framatome, both of Courbevoie, France

[21] Appl. No.: 210,444

[22] Filed: Jun. 23, 1988

[30] Foreign Application Priority Data

Jun. 23, 1987 [FR] France .................................. 87 08814

[51] Int. Cl.$^5$ ................................................ G21C 3/06
[52] U.S. Cl. ................................ 376/457; 148/11.5 R; 420/422
[58] Field of Search .................... 376/457; 148/12.7 R, 148/11.5 R, 11.5 F, 133, 150; 420/422

[56] References Cited

U.S. PATENT DOCUMENTS

| | | | |
|---|---|---|---|
| 4,238,251 | 12/1980 | Williams | 148/133 |
| 4,735,768 | 4/1988 | Stehle | 376/417 |
| 4,810,461 | 3/1989 | Inagaki | 376/457 |

*Primary Examiner*—Donald P. Walsh
*Attorney, Agent, or Firm*—Pollock Vande Sande & Priddy

[57] ABSTRACT

The present invention relates to a method of manufacturing tubes for a nuclear fuel element sheath, comprising a plurality of successive cold rolling and annealing steps including a final $\beta$ phase heat treatment consisting of maintaining said tube at a temperature between 950° C. and 1250° C. for a time duration sufficient for obtaining a homogeneous $\beta$ phase within and throughout the whole thickness of said tube, and rapidly cooling said tube to ambient temperature for retaining said $\beta$ phase throughout the whole thickness of said tube during subsequent cold processing steps including final cleaning of the tube.

12 Claims, No Drawings

METHOD OF MANUFACTURING A ZIRCONIUM-BASED ALLOY TUBE FOR A NUCLEAR FUEL ELEMENT SHEATH AND TUBE THEREOF

BACKGROUND OF THE INVENTION

The present invention relates to a method of manufacturing a zirconium-based alloy tube for a fuel element sheath to be used in a nuclear reactor, comprising a plurality of successive rolling and annealing steps.

The invention is particularly suitable, although not exclusively, in the field of manufacturing nuclear fuel element sheaths for pressurized water reactors, called PWRs, which sheaths are formed from a zircomium-based alloy.

The most widely used alloys include particularly the so-called "Zircaloy" alloys, among which are "Zircaloy-2" and Zircaloy-4", having contents to table I.

TABLE I

|  | Element | % in weight |
|---|---|---|
| Zircaloy 2 | Sn | 1.2–1.7 |
|  | Fe | 0.07–0.20 |
|  | Cr | 0.05–0.15 |
|  | Nr | 0.03–0.08 |
|  | Zr + impurities | complement |
| Zircaloy 4 | Sn | 1.2–1.7 |
|  | Fe | 0.18–0.24 |
|  | Cr | 0.07–0.13 |
|  | Zr + impurities | complement |

Zircaloy alloys have a low neutron absorption, and have generally acceptable mechanical strength and satisfactory stress-corrosion resistance.

It is nevertheless important to improve these qualities in order to keep the fuel elements in the reactor during a longer time (increasing their burn-up) and to further reduce the risks of creating cracks within the fuel sheaths. For this purpose, different heat treatments have been recommended during manufacture of the tubes to be used in a reactor.

In a manner known per se, the zircaloy tubes used for the fuel element sheaths, but also for the probe guide tubes for the tubes of clusters of control elements, controlling the nuclear reactors, are manufactured from hot worked ingots.

A first step consists in forging the ingot at a first range temperature called "α range" before heating the ingot to a second range temperature called "β range" and then rapidly cooling the ingot with water to ambient temperature. The billet is then extruded in α range, before cold rolling operations. Several successive rolling and annealing passes in α range are then carried out in a conventional manner.

By "α range" should be understood the temperature range in which the crystalline structure of the alloy is hexagonal and close packed (α phase), and by "β range" the temperature range in which the crystalline structure of the alloy is body centered cubic (β phase).

The transition from α phase to β phase of pure zirconium is 862° C.

Zirconium-based alloys have an intermediate range, where the two crystalling structures α and β are present. This range, where the alloy is in the so-called α+β phase, extends in the temperature range between 825° C. and 950° C.

Attempts have been made in different ways to improve the above-described manufacturing method, for example, by attempting to improve quenching conditions from the β phase (FR-2 244 831) or by providing, before the last rolling pass, a passage in β phase (U.S. Pat. No. 3 865 635) with better resistance as a claimed result.

In most cases, a final heat treatment of the tube is performed, consisting of a stress-relief and recrystallization in α phase annealing. To date, this final heat treatment has been considered necessary by those skilled in the art for obtaining an alloy having both generalized stress-corrosion resistance and acceptable mechanical strength under irradiation.

Methods for manufacturing tubes or structural parts for nuclear reactors, involving a final heat treatment in the β range, also exist for improving "pustular" corrosion resistance of the structural parts to reduce spalling of oxide flakes appearing on surfaces of said structural parts under normal operating conditions, particualarly under boiling water reactor conditions.

Thus, Pat Nos. US-4238251, DE-2951102 and DE-2951096 teach the use of different heating methods (induction, laser), and a final β range heat treatment of the structural parts. This β range treatment is however only a surface treatment and is only applied to structural parts which will not be in direct contact with nuclear fuel and therefore not subjected to stress-corrosion, contrary to tubes used for fuel cladding.

On the contrary, it should be noted that, when these patents mention applications of the methods to manufacture sheaths of fuel elements, they no longer teach β-phase treatment of the tubes, thought to be deterimental to corrosion resistance and mechanical strength in that case, but rather an α+β transition phase treatment (between 860°–930 ° C.), as it is known in equivalent prior art.

SUMMARY OF THE INVENTION

It is an object of the invention to provide an improved method of manufacturing zirconium alloy tubes for fuel element sheaths of zirconium alloy. It is a more particular object to provide a method for manufacturing tubes for fuel element sheaths which allows:

enhanced generalized corrosion resistance under radiations of the external face of the tube,
improved stress-corrosion resistance under radiations, of the internal part of the tubular fuel element sheath, the corrosive agent probably being iodine from the fission products,
enhanced radial and thermal creep resistance under neutron irradiation of the tubes.
better axial creep resistance of the tubes,
smaller axial enlargement of the tubes,
the possibility of keeping for a longer time, in the core of the reactor fuel elements, whose sheaths remain fluid-tight and corrosion resistant for a longer time under irradiation.

It is another object of the invention to provide a tube, for a nuclear reactor element sheath, having the above-mentioned characteristics.

The invention is predicated on the discovery that, when a final step consisting of a homogenizing treatment generating a homogeneous β-phase throughout the thickness of the tube is performed, followed by rapid cooling to ambient temperature, the metallurgical state of th tube is significantly improved the favorable results mentioned above and are obtained. These results are completely unexpected.

Up to the present, it has been preferred to finish manufacture by either a phase α treatment, or a phase α+β treatment, the teaching of the prior art warning against β treatment of nuclear fuel element cladding throughout its thickness because of expected detrimental effects both on general corrosion properties and physical properties in general, including creep strength and ductility. Also, for reasons of process control, rate and energy costs, β range temeprature was avoided and deemed not be retained. It has been found, however, that by cooling rapidly to ambient temperature a tube having a β phase structure, throughout its thickness, all these detrimental effects could be avoided and better physical and corrosion resistance characteristics obtained.

To this end, the invention provides a method of manufacturing a tube for fuel element sheaths for use in a reactor, said tube being made of a zirconium-based alloy, i.e., containing at least 90% of Zr by weight, comprising a plurality of successive cold rolling and annealing steps including a final β phase heat treatment consisting of maintaining said tube at a temperature between 950° C. and 1250° C. for a time duration sufficient for obtaining a substantially homogeneous β phase within and throughoutout the entire thickness of said tube, and rapidly cooling said tube to ambient temperature for retaining said β phase throughtout the entire thickness of said tube during subsequent steps including final cleaning of the tube.

In the preferred embodiment of the invention, the β phase homogenization heat treatment is carried out at about 1050° C., by induction heating, for example.

The method of the invention is particularly suitable for manufacturing a zirconium-based alloy fuel element sheath, for use in pressurized water nuclear reactors.

The inventors have found particularly suitable for the application a Zircaloy-4 alloy, whose composition, expressed in percentage by weight is approximately:

1.2% to 1.7% of Sn
0.18% to 0.24% of Fe
0.7% to 0.13% of Cr with a minimum of 0.28% of Fe + Cr.
80 to 270 ppm of C and
900 to 1600 ppm or $O_2$ and the reminder made of Zr and unavoidable impurities;

the tube for fuel element sheath obtained having a homogeneous metal β phase crystalline structure highly resistant to corrosion under radiation, and to stress-corrosion by iodine.

Thus, under rapid traction or pulling conditions (500 microns/second) at ambient temperature, in an iodine-containing atmosphere, it has been discovered that the ductility loss for a sheath obtained with prior art methods was of the order of 60%, whereas it is only 15% for a β-phase treated sheath in accordance with the present invention.

Similarly, it has been discovered that for a sheath of the present invention, heated at 100° C. for 240 hours, under a pressure of 130MPa, diametrical deformation less than 0.1% was obtained, whereas such deformation is processed by order of 1.5% for sheaths of the prior art methods.

Because of the long experience acquired in using the Zircaloy as a material for nuclear reactor fuel element cladding, the inventors have found it advantageous to remain within the ranges of Zircaloy 4 for which the test results are numerous. But the inventors have also considered that the method fo the invention could provide variable advantages depending on the exact element composition of the Zircaloy-4. Consequently, while remaining within the composition ranges of Zircaloy 4, they have sought to optimize the chemical composition of the alloy to be used with the method of the present invention. In fact, they have observed that better results were obtained for stress corrosion resistance and mechanical strength, for chemical compositions having;

an Sn content by weight of between 1.2% and 1.5%, and advantageously 1.35%;

a Cr content by weight of between 0.09 and 0.13%;

the sum of the Fe and Cr contents greater than 0.30% by weight advantageously in the range of 0.32-0.33%;

a carbon content by weight of between 80 and 200 ppm and advantageously about 140 ppm;

an $0_2$ content by weight of between 1100 and 1500 ppm, and advantageous about 1300ppm;

For example, by heating sheath tubes at 400° C. in vapor phase, the increasing weight due to oxides was respectively 32 mmg/dm2 for a sheath of the prior art, and 27 mmg/dm2 for a low tin content sheath (within the range above mentioned) subject to the β-treatment of the present invention; better external corrosion resistance was thus obtained.

A smaller growth under irradiation was also observed due to an increase of the Kearns factor, relative pole figure 0.02 in the axial direction, namely an increase of the Kearns factor from 0.07 to 0.25, thus approaching the value corresponding to isotropy (0.33).

The invention and its advantages will be better understood from reading the following tables II and III and the accompanying explanations.

Table II gives the results of comparative tests carried out on a pressurized water reactor fuel sheath according to the invention, having undergone β heat treatment, compared with a standard sheath element of the prior art. This table shows corrosion resistance and mechanical strength are enhanced by the method of the invention.

TABLE II

| | |
|---|---|
| External corrosion resistance: | Reduction of 10% of the thickness of the $ZrO_2$ layer on a sheath treated according to the invention, with respect to a standard sheath, while submitted to same operating conditions in pressurized water reactors |
| Corrosion resistance (under stress/iodine) | Ductility loss under axial forces exerted on the sheath, at ambient temperature and in the presence of iodine, of the order of a factor 4, with respect to released condition. |
| Radial thermal creep | Substantially zero with the tube of the invention. |
| Radial creep under flux | Appreciably smaller with the tube of the invention (of about a factor 5) than with a standard sheath. |
| Axial enlargement | Less than that of a standard sheath under a released condition within pressurized water reactor. |

Table III gives the values or ranges of values of the Sn, Cr, Fe + Cr, C and $O_2$ contents (% by weight) of Zircaloy 4 for which particularly enhanced results have been obtained with the method of the invention.

The results obtained with Zircaloy-4 as processed according to the invention are compared with the results obtained with a regular prior art Zircaloy 4 with no particular composition as found in commerce.

TABLE III

| Element | Optimal ranges | Optimal values | Advantages |
| --- | --- | --- | --- |
| Sn % | 1.2–1.5 | 1.3 | better corrosion resistance |
| Cr % | 0.09–0.13 | | better corrosion resistance |
| Fe + Cr % | 0.28–0.37 | >0.30 | better corrosion resistance |
| C ppm | 80–200 | 140 | minimizes enlargement under irradiation of the sheath tube and optimizes radial creep under flux. |
| $O_2$ ppm | 1100–1500 | 1300 | minimizes enlargement under irradiation of the sheath tube. |

DETAILED DESCRIPTION

A method of manufacture in accordance with the invention is described hereafter in greater detail.

After reception of the Zirconium based alloy trexs (of the type of the alloys described in the invention), the following steps are carried out: degreasing, if required, then pickling or cleaning in fluonitric bath before a first cold rolling pass. This first pass is followed by the following operations:
precleaning,
deburring and placing in basket,
degreasing,
cleaning in the fluonitric bath, drying and weighing,
annealing under vacuum and/or within an inert atmosphere, in α phase, and again
cleaning in a fluonitric bath (if necessary).

A second rolling pass is then carried out followed by the same operations, then a third rolling pass followed by precleaning, deburring, degreasing, cleaning, drying and weighing operations of the tube obtained.

Once these operations are completed, the final heat treatment is carried out. It is in the nature of β heat tretment fo the tube consisting of continuous induction heating, maintaining the tube at a temperature of about 1050° C. with a travelling speed along the tube between 500 mm/minute and 900 mm/minute, advantageously at about 700mm/minute, and rapid cooling, at a speed between 100° C./second and 150° C./second, advantageously at about 120° C./second, to ambient temperature in an argon atmosphere.

After final cleaning in a fluonitric bath, if required, the tube is grit-blasted on the inside. It is then cut to the length required for forming a fuel element sheath. The external surface is also polished mechanically, the internal surface is cleaned chemically, and the faces of the tube are trued and the tube is weighed.

Finally, the different tests required are performed, [health control (U.S. or eddy current), dimensional and straightness, etc...] before final packing.

The present method of the invention, and the tubes for nuclear fuel element sheaths of the invention, are not limited to the embodiments which have been more precisely described. It covers also:
the manufacutre of tubes for sheaths to be filled with fertile fuel, such as sheaths for spectrum variation cluster elements, for use in a spectrum variation reactor;
the manufacture of tubes comprising more or less numerous successive annealing phases and rolling passes than the number mentioned above.

We claim:

1. Method of manufacturing a zirconium-base alloy tube for a nuclear fuel element sheath, comprising, after a plurality of successive sequences each including cold rolling and annealing, a final β-phase heat treatment consisting of heating said tube to a temperature between 950° C. and 1250° C., maintaining said tube at said temperature for a time duration sufficient for obtaining a homogeneous β-phase structure within and throughout the whole thickness of the tube and cooling the tube at a rate in the range between 100° C./s and 150° C./s for retaining said β-phase throughout the whole thickness of said tube, and omitting any subsequent finishing operation of a nature which would cause reversal toward the α-phase.

2. Method according to claim 1, wherein the β phase heat treatment is carried out at about 1050° C.

3. Method according to claim 1, comprising the additional steps of cleaning the tube, grit-blasting the inside of the tube and polishing the external surface of the tube after said final β-phase heat treatment for use as a nuclear fuel element sheath.

4. Method according to claim 1, wherein, during said final β-phase heat treatment, the tube is heated to said temperature by induction heating of the tube with a travelling speed of the tube along the axis thereof between 500 mm/mn and 900 mm/mn and said rapid cooling is carried out in an argon atmosphere.

5. Method according to claim 4, wherein said travelling speed is approximately 700 mm/minute.

6. Method according to claim 4, wherein the rapid cooling is carried out at about 120° C. per second.

7. Method of producing a nuclear fuel element sheath in direct contact with fuel when in use in a pressurized water nuclear reactor, comprising:
preparing a zirconium-base alloy tube by repeating a sequence of cold rolling and annealing steps until the tube has its final shape,
subjecting the tube to a final β-phase heat treatment consisting of heating the tube to a temperature of from 950° C. to 1250° C., maintaining said tube at said temperture for a time duration sufficient for obtaining a homogeneous β-phase within and throughout the whole wall of the tube and cooling said tube at a rate of between 100° C./s and 150° C./s in an argon atmosphere, whereby said tube has a homogeneous β-phase crystalline structure, and
forming a sheath from said tube by cold finishing operation selected for leaving the β-phase structure unaltered.

8. A pressurized water reactor fuel element sheath having a tube in contact with the fuel and with the water and consisting of a zirconium-base alloy containing, by weight:
1.2 to 1.7% of Sn
0.18 to 0.24% of Fe
0.07 to 0.13% of Cr with a minimum of 0.28% of Fe + Cr
80 to 270 ppm of C, and 900 to 1600 ppm of 02
the total of Zr and the above-listed components being 100% except for unavoidable impurities, said tube having a homogeneous β-phase crystalline structure highly resistant to corrosion under radiation and to stress corrosion by iodine throughout the wall thereof.

9. Fuel element sheath according to claim 8, wherein the sum of Fe and Cr contents is greater than 0.30%.

10. Fuel element sheath according to claim 9, wherein the Sn content is approximtely 1.35%.

11. Fuel element sheath according to claim 9, wherein the sum of Fe and Cr contents is in the range between 0.32% and 0.33%.

12. Fuel element sheath according to claim 8, wherein the carbon content is between 80 and 200 ppm and the $O_2$ content is between 1100 and 1500 ppm.

* * * * *